United States Patent [19]
Katagiri et al.

[11] Patent Number: 5,886,446
[45] Date of Patent: Mar. 23, 1999

[54] MOTOR WITH OPENING-WIDTH ADJUSTING MEMBERS FOR SALIENT POLE SLOTS

[75] Inventors: Masayuki Katagiri; Kazutaka Kobayashi, both of Nagano, Japan

[73] Assignee: Kabushiki Kaisha Sankyo Seiki Seisakusho, Nagano, Japan

[21] Appl. No.: 57,516

[22] Filed: Apr. 9, 1998

[30] Foreign Application Priority Data

Apr. 10, 1997 [JP] Japan .................................... 9-092011

[51] Int. Cl.⁶ .............................. H02K 3/487; H02K 1/24
[52] U.S. Cl. ......................... 310/214; 310/218; 310/269; 29/598; 29/596
[58] Field of Search ..................... 310/67 R, 89, 310/91, 112, 191, 192, 195, 209, 264, 269, 262, 214, 215, 218; 29/596, 598, 602.1, 606

[56] References Cited

U.S. PATENT DOCUMENTS

| | | | |
|---|---|---|---|
| 434,206 | 8/1890 | Schmid ................................... | 310/214 |
| 3,766,417 | 10/1973 | Hallenbeck ............................. | 310/214 |
| 4,274,027 | 6/1981 | Higuchi et al. ......................... | 310/269 |
| 4,432,135 | 2/1984 | Greenlee ................................. | 29/598 |
| 5,086,246 | 2/1992 | Dymond et al. ........................ | 310/269 |
| 5,498,916 | 3/1996 | Lindner et al. ......................... | 310/214 |

Primary Examiner—Thomas M. Dougherty
Assistant Examiner—Tran N. Nguyen
Attorney, Agent, or Firm—Sughrue, Mion, Zinn, MacPeak & Seas, PLLC

[57] ABSTRACT

In the stage of winding a drive coil (17) on salient poles (114) in the assembling of a motor (1), the opening width of an armature core (11) is wide enough to allow easy and proper winding of the drive coil (17). After the winding of the drive coil (17), opening-width adjusting members (50A) are put within open slots (100), to thereby reduce the opening width of the armature core (11) at the flux gathering parts (54A) and (55A) of the opening-width adjusting member (50A). The opening-width adjusting member (50A) is positioned and fixed, by its elasticity, within each open slot.

7 Claims, 10 Drawing Sheets

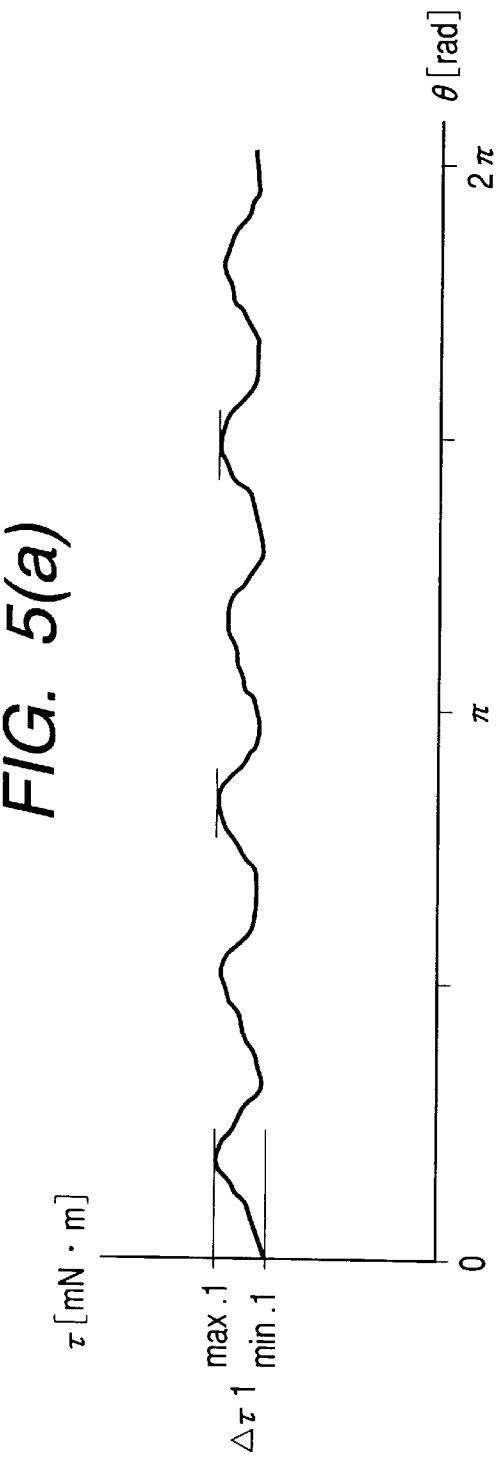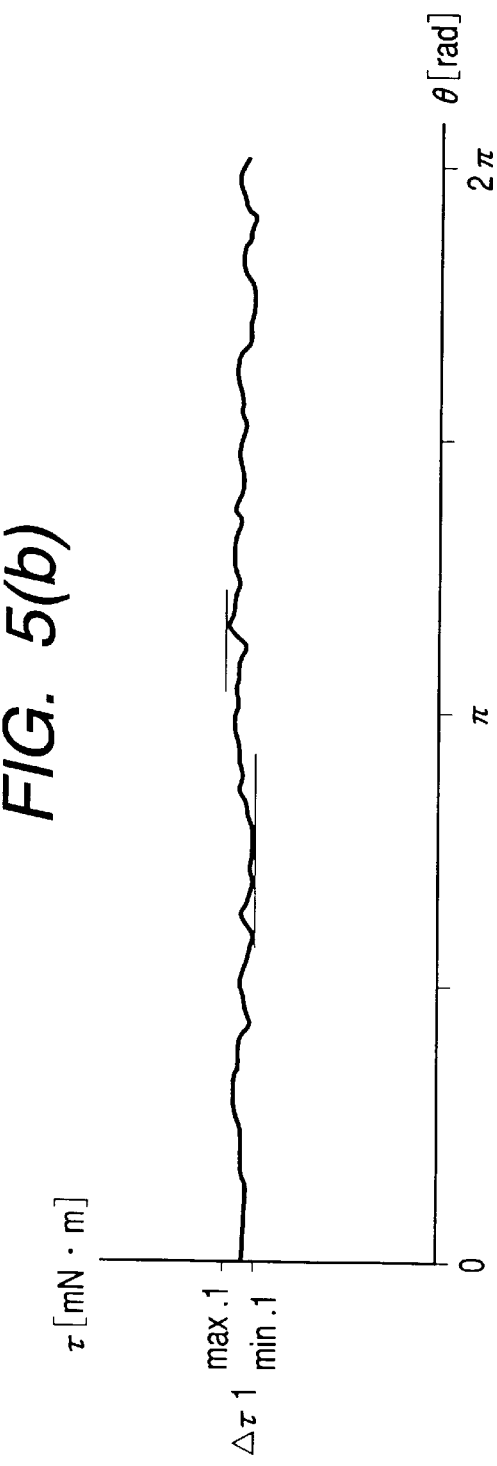

MOTOR WITH OPENING-WIDTH ADJUSTING MEMBERS FOR SALIENT POLE SLOTS

BACKGROUND OF THE INVENTION

1. Field of the Invention

The present invention relates to a motor, and more particularly to an armature structure of the motor.

2. Related Art

The armature core of a conventional motor is illustrated in FIG. 11(a). As shown, the armature core includes a plural number of salient poles 114. Those poles are radially extended from the center of the armature core, and each of the salient poles includes an arm 116 and an arcuate head 117 extending to both sides at the extreme end of the arm. An open slot 100 is present between the adjacent salient poles 114. A coil is wound on the arms of the salient poles 114 through the open slots 100. Specifically, a conductive wire is wound on the arms 116 of the salient poles 114 in a manner that the armature core 11 is moved relatively to and around a nozzle which guides and feeds the conductive wire. In this case, the width W of the opening of each open slot 100 is sufficiently wide so as not to hinder a smooth movement of the nozzle by the arcuate heads 117.

However, if the opening width of each open slot 100 is too narrow as shown in FIG. 11(b), the nozzle is limited in its movement for winding the drive coil 17. The limited movement of the nozzle creates the following problems. The winding of the drive coil 17 around the arms 116 is not uniform. That is, the wound coil layer is thicker toward the extreme end of each arm 116, and forms dead spaces D near to the roots of the arms 116, as shown. The presence of the dead spaces D reduces the number of turns of the wound drive coil 17, and possibly gives rise to a problem that the resultant wound coil layer is easy to get out its shape and in turn to loosen the wound drive coil 17.

To secure the properly winding of the drive coil 17, it is desirable that the opening widths of the open slots 100 are enough wide. However, the wide opening width creates another problem of degradation of the output characteristic of the motor. In a case where the opening present between the adjacent arcuate heads 117 is large, a magnetic flux density is considerably reduced in the openings, and a reluctance of the magnetic circuit including the openings is remarkably increased. The result is that a large cogging occurs in the motor, and the motor loses its smooth continuous rotation.

The technique in this field has been unable to solve the following antinomic problem; when the end of properly winding the drive coil 17 is achieved, the end of smoothing the motor output is lost, and vice versa.

SUMMARY OF THE INVENTION

Accordingly, an object of the present invention is to provide a motor with an improved armature core structure, the structure being improved such that a drive coil may be wound in proper positions in a simple manner, and a variation of flux density is suppressed, the flux gathering function is enhanced, no cogging occurs, and a smooth continuous rotation of the rotor is secured.

An aspect to the present invention, there is provided A motor including an armature core including a plural number of salient poles each having an arm and an arcuate head extending to both sides at the top of said arm, and a base interconnecting the lower ends of said salient poles, said salient poles extending radially and outwardly from said base; open slots each formed between said adjacent salient poles; a drive coil wound on said arms of said armature core; a magnet disposed while being confronted with the circumferential outer surfaces of said arcuate heads; and open-width adjusting members located into said open slot, each of said open-width adjusting members including: a first positioning part arranged to one of directly contact with circumferential outer surfaces of said base and indirectly contact with said circumferential outer surfaces of said base through an interposing member, second positioning parts extending radially and outwardly from said first positioning part, each second positioning part being elastically brought into contact with said salient pole serving as said open slot in such a manner said second positioning parts is elastically deformable in a direction to move said second positioning parts approach to each other and in another direction to move those away from each other, and flux gathering parts formed on each tip end of said second positioning part on an arc shaped space defined between said salient poles so as to confront with said magnet, wherein said magnet and said armature core is rotated relative to each other.

According to the present invention, in the stage of winding the drive coil on the salient poles, the opening width of the armature core is sufficiently wide. Therefore, the drive coil may be wound properly. After the winding of the armature core, the opening-width adjusting member is put in each open slot. With the putting of the open-width adjusting member, the opening width of the armature core is reduced at the magnetic flux gathering parts of the opening-width adjusting member. The reduced opening width accrues to the following advantages: a variation of magnetic flux distribution is suppressed; the magnetic flux gathering function is enhanced; no cogging occurs; and a smooth rotation of the motor is secured. Further, the open-width adjusting member is fixed within each open slot by the utilization of the first and second positioning parts of the open-width adjusting member and the elasticity of the open-width adjusting member. This technical feature of the invention provides reliable positioning and fixing of the open-width adjusting member within the open slot, and an easy assembling of the motor.

BRIEF DESCRIPTION OF THE DRAWINGS

FIG. 5(a) is a graph showing a torque variation of the prior motor, and FIG. 5(b) is a graph showing a torque variation of the motor of the first embodiment;

DETAILED DESCRIPTION OF THE PREFERRED EMBODIMENTS

The preferred embodiments of the present invention, which are motors, will be described with reference to the accompanying drawings. Before proceeding with the preferred embodiments, the construction of the motor, which is common to the respective embodiments of the invention, will be described with reference to FIGS. 1 through 3.

Overall construction of the motor

Figure 1:
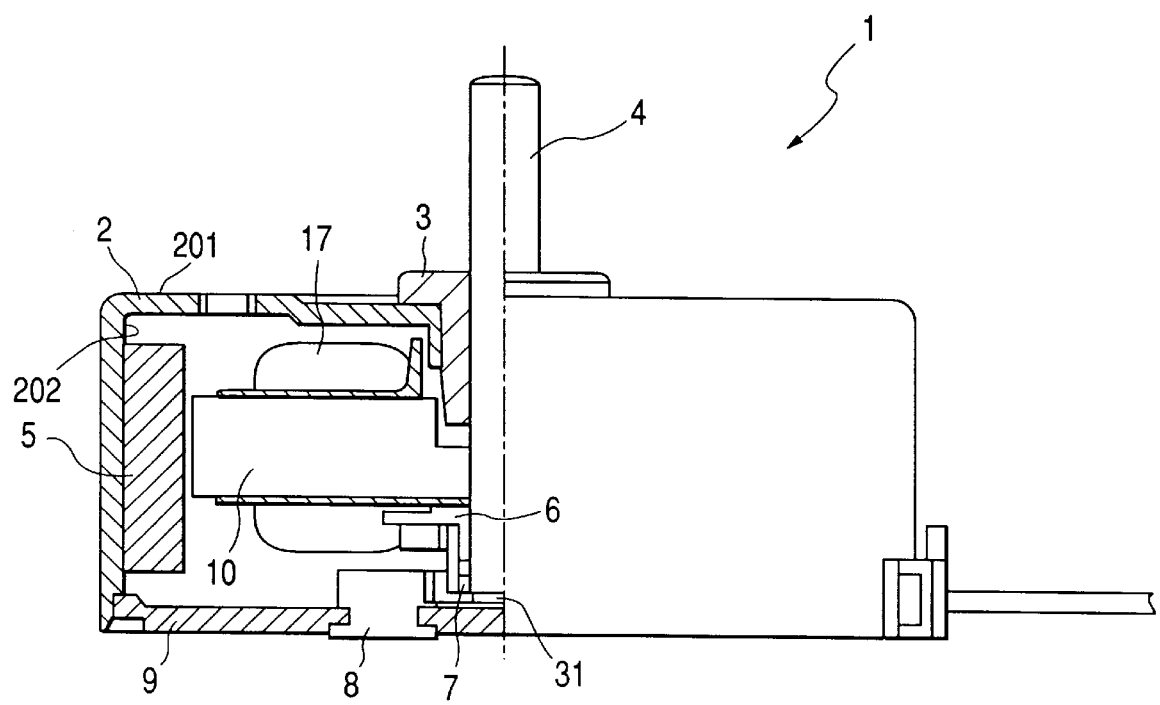
FIG. 1 is a half sectional view showing a motor.

Reference is made to FIG. 1 showing a half sectional view of a motor, which is constructed according to the present invention. The illustrated motor 1 is a small motor of the thin type. The motor 1 is covered with a motor housing. The motor housing is formed with a cup-like cover case 2 and an end plate 9. An opening formed in the lower side or bottom (when viewed in the drawing) of the cover case 2 is closed by the end plate 9. A bearing 3 is fixedly mounted onto the center of the upper side 201 (when viewed in the drawing) of the cover case 2. A motor shaft 4 is rotatably supported by the bearing 3. An armature 10 is fixedly mounted on the central part (when viewed in the axial direction) of the motor shaft 4 within the housing. Accordingly,the armature 10 is rotated together with the motor shaft 4. A ring-like magnet 5 is fixedly mounted on the inner surface 202 of the cover case 2, while being confronted with the circumferential outer face of the armature 10 with a small gap interposed therebetween. A commutator 6 is secured to the motor shaft 4 at a location under the armature 10. A brush 7 is held by a brush holder 8 while being in contact with the contact surface of the commutator 6. The brush holder 8 is secured onto the end plate 9, which closes the opening of the cover case 2. A thrust bearing 31 is secured to the end plate 9. The thrust bearing 31 rotatably supports the base of the motor shaft 4. As stated above, the upper part of the motor shaft 4 is rotatably supported by the bearing 3.

Figure 2A:
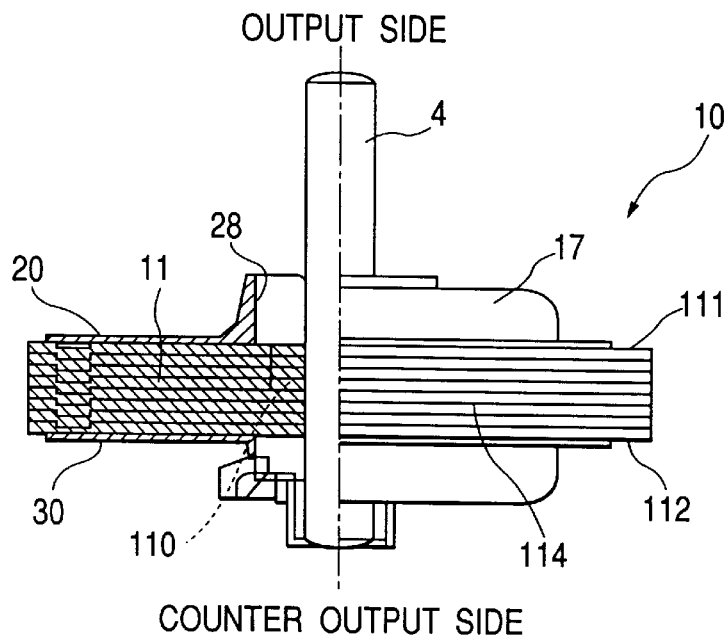
FIG. 2(a) is a half sectional view of an armature of a motor which is an first embodiment of the present invention.

FIGS. 2(a) is a half sectional view of the armature 10 and 2(b) is a plan view showing the counter output-side of the armature 10.

Insulators 20 and 30 are respectively layered on the output side end surface 111 and the counter output-side end surface 112 of an armature core 11 for the purpose of electrically insulating a drive coil 17 from the armature core 11.

A plural number of core plates made of silicon steel are laminated into a unit structure, or the armature core 11. The armature core 11 includes a base 110 and three salient poles 114 radially extending outward from the base 110. The base 110 has a shaft hole 113 through which the motor shaft 4 passes. Each of the salient poles 114 includes an arm 116 extended radially and outwardly and an arcuate head 117 provided at the top of the arm 116. The arcuate head 117 is arcuately extended to both sides at the top of the arm 116. The drive coil 17 is wound on those arms 116 through the insulators 20 and 30 being interposed therebetween.

Insulator structures of the output side and counter output-side of the motor

Figure 3A:
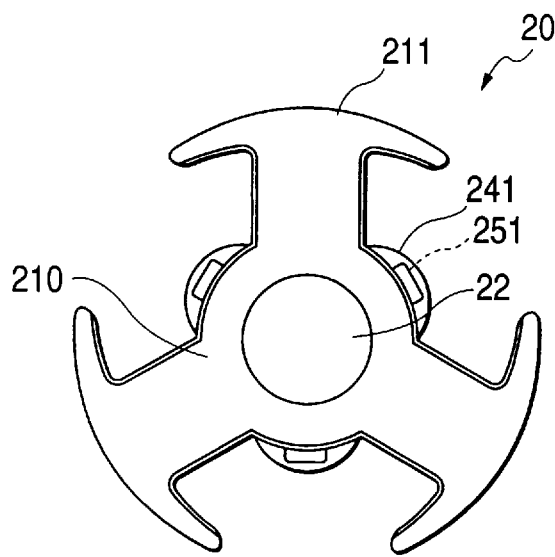
FIG. 3(a) is a plan view showing an output-side insulator used of the motor based on the present invention.
Figure 3B:
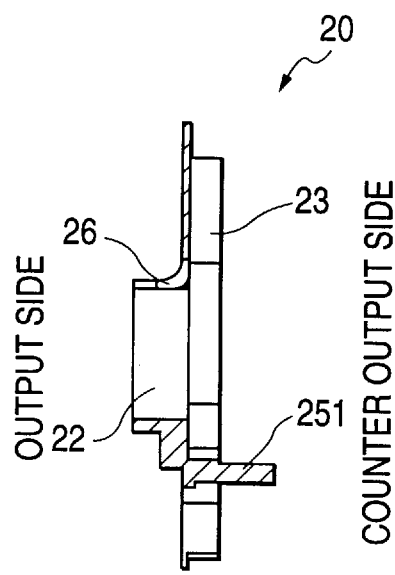
FIG. 3(b) is a cross sectional view of the output-side insulator shown in FIG. 3(a)

FIGS. 3(a) and 3(b) are a plan view and a cross sectional view showing the insulator 20 on the output side of the armature 10. The output-side insulator 20 is a molded product of resign, e.g., polyoxymethylene. The output-side insulator 20 resembles in configuration the output-side end surface 111 of the armature core 11. Specifically, the output-side insulator 20 includes a ring-like portion 210 located on the center thereof and three salient-pole covers 211. Those salient-pole covers are radially extended outward from the ring-like portion 210 while being spaced angularly and equidistantly. The salient-pole covers 211 of the output-side insulator 20 have side surfaces 23. Each of the side surfaces 23 ranges in length from the root of the salient-pole cover 211 to the arcuate head of the salient-pole cover, while being extended in width to ward the counter output-side of the armature 10. The width of each side surface 23 is about the half of the thickness of the armature core 11 (when viewed in the axial direction).

Figure 3C:
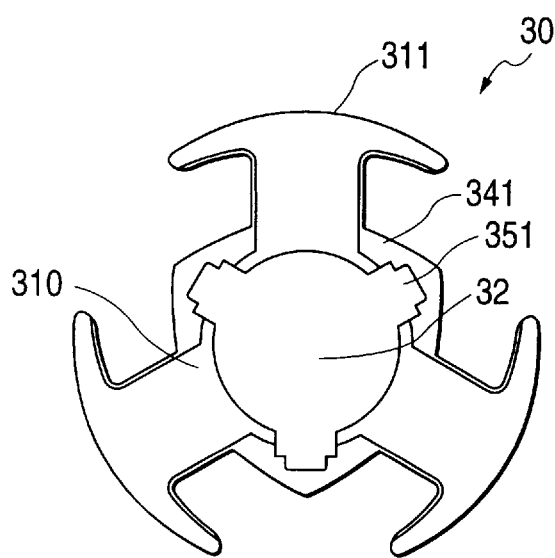
FIG. 3(c) is a plan view showing a counter output-side insulator used of the motor based on the present invention.
Figure 3D:
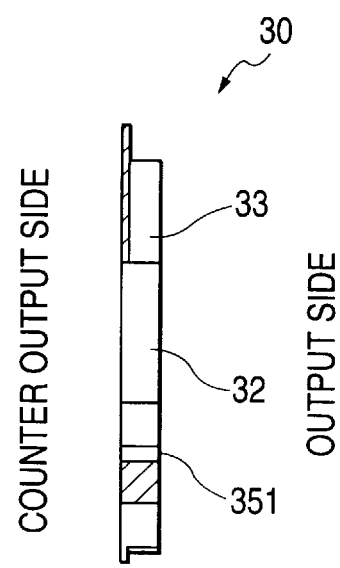
FIG. 3(d) is a cross sectional view of the counter output-side insulator shown in FIG. 3(c)

FIGS. 3(c) and 3(d) are a plan view and a cross sectional view showing the insulator 30 on the counter output side of the armature 10. The counter output-side insulator 30 is also a molded product of resign, e.g., polyoxymethylene. The counter output-side insulator 30 is configured like the counter output-side end surface 112 of the armature core 11. Specifically, the counter output-side insulator 30 includes a ring-like portion 310 located on the center thereof and three salient-pole covers 311. Those salient-pole covers are radially extended outward from the ring-like portion 310 while being spaced angularly and equidistantly. The salient-pole covers 311 of the counter output-side insulator 30 have side surfaces 33. Each of the side surfaces 33 ranges in length from the root of the salient-pole cover 311 to the arcuate head of the salient-pole cover, while being extended in width toward the counter output-side of the armature 10. The width of each side surface 33 is about the half of the thickness of the armature core 11 (when viewed in the axial direction).

When the insulators 20 and 30 are layered over both sides, (i.e., the output-side end surface 111 and the counter output-side end surface 112) of the armature core 11 (when viewed in the axial direction of the motor), the armature core 11 is substantially entirely covered with the insulators 20 and 30, except the circumferential outer surfaces of the arcuate heads 117 of the salient poles 114.

The center, ring-like portion 210 of the output-side insulator 20 has a through-hole 22, which is larger in diameter than the shaft hole 113 bored in the armature core 11. Similarly, the center, ring-like portion 310 of the counter output-side insulator 30 has a through-hole 32, which is larger in diameter than the shaft hole 113 of the armature core 11.

As shown also in FIGS. 3(a) and 3(b), expanded portions 241 are angularly and equidistantly disposed on the circumference of the center, ring-like portion 210 of the output-side insulator 20; the outer edges of those expanded portions 241 are each curved outward; and the expanded portions 241 are each located between the adjacent salient-pole covers 211. The expanded portions 241 are each provided with an engaging protrusion 251, which is protruded toward the counter output side in the axial direction of the motor. As shown in FIGS. 3(c) and 3(d), triangularly shaped, outward expanded portions 341 are angularly and equidistantly disposed on the circumference of the center, ring-like portion 310 of the counter output-side insulator 30 in a state that the expanded portions 341 are each located between the adjacent salient-pole covers 311. Engaging recesses 351 are respectively formed in the expanded portions 341 while being located at a location corresponding to the corresponding engaging protrusion 251 of the output-side insulator 20. The engaging recesses 351 of the expanded portions 341 are opened into the through-hole 32 of the ring-like portion 310 of the counter output-side insulator 30. The dimension of each of the engaging recesses 351 is selected so as to allow each engaging recess 351 to receive the extreme end of each engaging protrusion 251 when the latter is forcibly inserted into the former, or the engaging recess.

When the insulators 20 and 30 are applied respectively onto the output-side end surface 111 and the counter output-side end surface 112 of the armature core 11, the extreme ends of the engaging protrusions 251 of the output-side insulator 20 are aligned with the engaging recesses 351 of the counter output-side insulator 30, respectively. In the aligned state, the insulators 20 and 30 are pressed against those end surfaces 111 and 112 of the armature core 11, respectively. At this time, the extreme ends of the engaging protrusions 251 are respectively forcibly put into the engaging recesses 351 while being elastically deformed. The result is that the output-side insulator 20 and the counter output-side insulator 30 are coupled together, and firmly attached onto the output-side end surface 111 and the counter output-side end surface 112 of the armature core 11. In this case, the extreme ends of the engaging protrusions 251 are put into the engaging recesses 351, and the former may be bonded to the latter by adhesive. By so doing, the interconnection of them is more reliable.

Figure 2B:
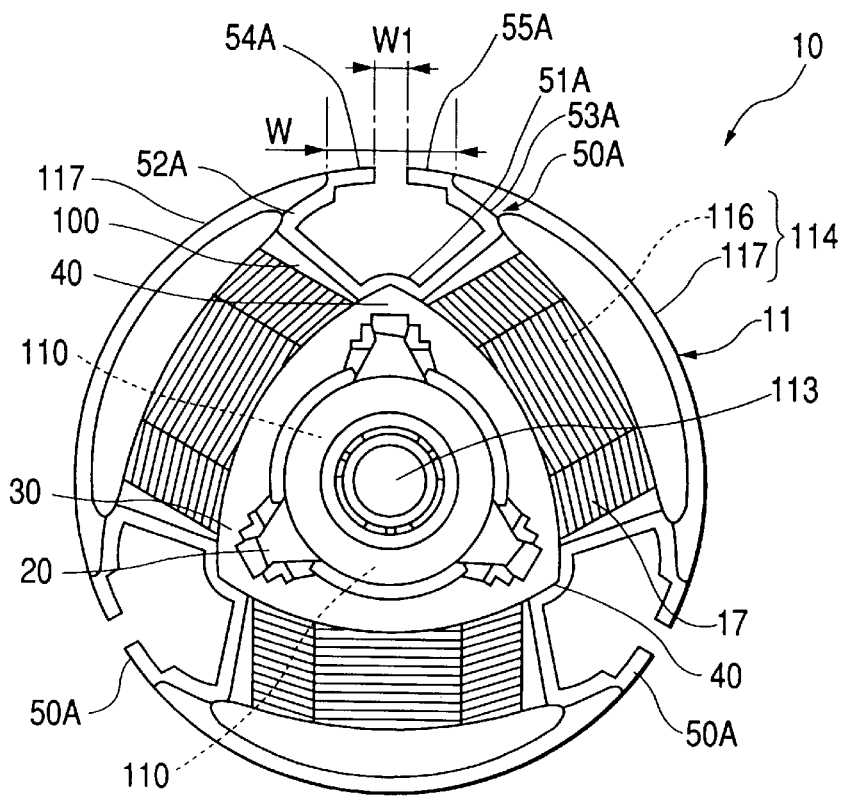
FIG. 2(b) is a plan view showing the counter output-side of the motor.

In a state that the insulators 20 and 30 are applied to the armature core 11, the expanded portions 241 of the output-side insulator 20 and the expanded portions 341 of the counter output-side insulator 30 are layered one over the other, to thereby form coil guides 40 (FIG. 2(b)). With provision of the coil guides 40, there is no chance that when in winding the drive coil 17 on the salient poles 114 (exactly, arms 116) of the armature core 11, the drive coil 17 mistakenly moves to another salient pole 114.

Winding of the drive coil

In the thus constructed armature 10, when the drive coil 17 is wound around the arms 116 of the armature core 11, which are covered with the insulators 20 and 30, the open slots 100 each provided between the adjacent salient poles 114 are utilized as referred to in the prior art description. In the stage of winding the drive coil 17 in the motor manufacturing process, the opening width W of each of the open slots 100 is sufficiently wide. Therefore, the drive coil 17 may be wound easily and properly without producing any dead space. Where the opening width W of each open slot 100 is large, the reluctance greatly varies to cause the cogging. The cogging ensures an unsmooth continuous-rotation of the rotor. To cope with the cogging problem, the present invention uses opening-width adjusting members which are placed within the open slots 100, as will be seen when reading the embodiment descriptions to follow.

First embodiment

Figure 4A:
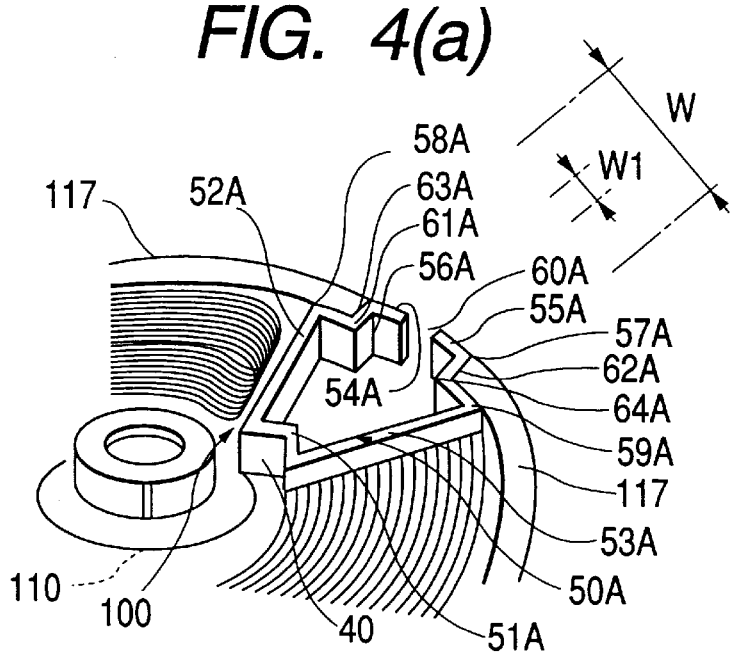
FIG. 4(a) is a perspective view showing a key portion of an armature used in the motor which is the first embodiment of the present invention.
Figure 4B:
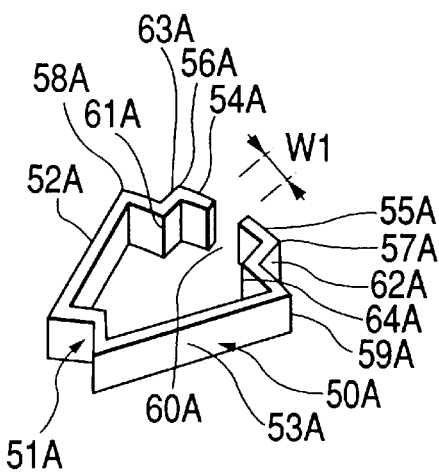
FIG. 4(b) is a perspective view showing an open-width adjusting member when viewed from its first positioning part side.
Figure 4C:
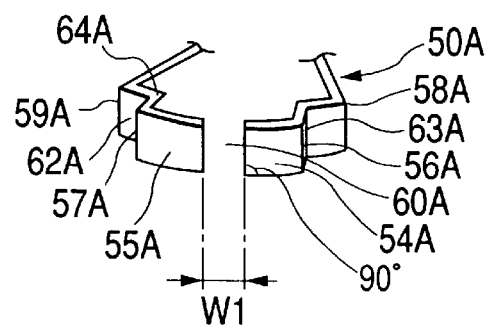
FIG. 4(c) is a perspective view showing the open-width adjusting member when viewed from the magnetic flux gathering portion or parts side.

Reference is made to FIGS. 4(a) through 4(c). FIG. 4(a) is a perspective view showing a key portion of the armature used in the motor which is an first embodiment of the present invention; FIG. 4(b) is a perspective view showing an opening-width adjusting member when viewed from a first positioning part side; and FIG. 4(c) is a perspective view showing the opening-width adjusting member when viewed from a flux gathering parts side. In the present embodiment, an opening-width adjusting member 50A (FIGS. 4(a) to 4(c)) is disposed within each of the open slots 100. The opening-width adjusting member 50A consists of a magnetic plate, which is bent to be shaped like a fan so as to conform to the plan configuration of each open slot 100. The opening-width adjusting member 50A includes a first positioning part 51A, second positioning parts 52A and 53A, and flux gathering parts 54A and 55A. The first positioning part 51A is in contact with an interposing member, which is placed on the circumferential outer surface of the base 110 of the armature core 11, viz., the coil guide 40 by the insulators 20 and 30. The base 110 interconnects the lower ends of the salient poles 114 of the armature core 11. The second positioning parts 52A and 53A are extended from the first positioning part 51A toward their extreme ends while the space therebetween progressively increases. Therefore, those second positioning parts 52A and 53A, which are elastically deformable when forces are applied thereonto, may be bent or is flexible in a direction to make those positioning parts approach to each other and in another direction to move those away from each other. The extreme ends of the second positioning parts 52A and 53A are inwardly bent or flexed to form the flux gathering parts 54A and 55A. The flux gathering parts 54A and 55A are located between the arcuate heads 117 of the adjacent armature core 11 while being confronted with the ring-like magnet 5 when viewed radially. A gap 60A of the width W1 is present between the tips of the flux gathering parts 54A and 55A of the opening-width adjusting member 50A. The gap 60A extends straightforwardly in the thick direction of the armature core 11.

The second positioning part 52A includes a step 63A defined by a bending corner 56A to form the flux gathering part 54A and bending corners 58A and 61A. Similarly, another second positioning part 53A includes a step 64A defined by a bending corner 57A to form the flux gathering part 55A and bending corners 59A and 62A. As best illustrated in FIG. 4(a), the steps 63A and 64A are brought into engagement with the side edges of the arcuate heads 117.

Since both sides of the armature core 11 are covered with the insulators 20 and 30, respectively, the first positioning parts 51A of the opening-width adjusting members 50A are brought into contact with the base 110 of the armature core 11 in state that the insulators 20 and 30, located in the vicinity of the base 110, are interposed therebetween. The coil guide 40 formed by the insulators 20 and 30 is triangularly protruded in the contact portion in contact with the first positioning part 51A of the opening-width adjusting member 50A. The first positioning part 51A of each opening-width adjusting member 50A is shaped like V so as to receive the triangularly protruded coil guide 40. The opening-width adjusting member 50A is formed of a magnetic plate, e.g., an iron plate. Because of this, it is desirable to secure a reliable insulation of the opening-width adjusting member 50A from the drive coil 17. To this end, an insulating layer may be formed on a portion of the opening-width adjusting member 50A where the member comes in contact with the drive coil 17.

The opening-width adjusting members 50A thus constructed are disposed in the open slots 100, respectively, after the drive coil 17 is wound on the arms 116 of the armature core 11, which are already covered with the insulators 20 and 30. The opening-width adjusting member 50A is somewhat larger than the open slot 100. The opening-width adjusting member 50A has the second positioning parts 52A and 53A. Then, the second positioning parts 52A and 53A, when pushed together, are flexed inward about their roots of the first positioning part 51A. Therefore, the second positioning parts 52A and 53A of the opening-width adjusting member 50A are flexed inward; in this state the opening-width adjusting member 50A is put into the open slot 100; the forces to bend inward those second positioning parts 52A and 53A is removed; and the opening-width adjusting member 50A restores to its original form within the open slot 100, viz., it expands within the slot. The result is that the first positioning part 51A is brought into contact with the coil guide 40, and hence the opening-width adjusting member 50A is positioned there, and that the steps 63A and 64A of the extreme ends of the second positioning parts 52A and 53A are brought into contact with the side edges of the arcuate heads 117, and the opening-width adjusting member 50A is also positioned there. In a state where the steps 63A and 64A are in engagement with the side edges of the arcuate heads 117, the flux gathering parts 54A and 55A are in align with the prolongation from the arcuate heads 117 and never deviate outward from the prolongation. The opening-width adjusting member 50A is fixed to within the open slot 100 by its elasticity. To secure a more reliable fixing of the opening-width adjusting member within the slot, the opening-width adjusting member 50A may be bonded to the slot 100 by adhesive.

In the embodiment, the first positioning parts 51A of the opening-width adjusting members 50A are brought into contact with the coil guides 40 of the insulators 20 and 30. If necessary, the first positioning parts 51A may be brought into direct contact with the base 110 of the armature core 11. In this case, formation of protrusions on the circumferential outer surface of the base 110 makes it easy to position the opening-width adjusting members 50A.

The thus constructed motor of the first embodiment have inventive and unique technical features, and those features produce various beneficial effects.

1) The opening width of the armature core 11 is equal to the opening width W of each open slot 100 in the stage of winding the drive coil 17 on the salient poles 114. With this feature, the drive coil 17 may be wound at proper positions in an easy manner.

2) After the drive coil 17 is wound on the salient poles 114, the opening-width adjusting members 50A are disposed within the open slots 100. Therefore, the openings are partially occupied with the flux gathering parts 54A and 55A of the opening-width adjusting member 50A. The width of each opening of the armature core 11 is reduced to the gap width W1 of the gap between the paired flux gathering parts 54A and 55A being opposed to each other. This feature produces the following useful effects: a variation of magnetic flux density is suppressed; the flux gathering function is improved; no cogging occurs; and a smooth rotation of the motor 1 is secured.

3) The opening-width adjusting member 50A is put within each open slot 100 by the utilization of the first positioning part 51A, the second positioning parts 52A and 53A, and the elasticity of the opening-width adjusting member 50A itself. This feature enables the opening-width adjusting member 50A to be reliably positioned and set in the open slot 100, and hence provides an easy assembling work of the motor.

Figure 11A:
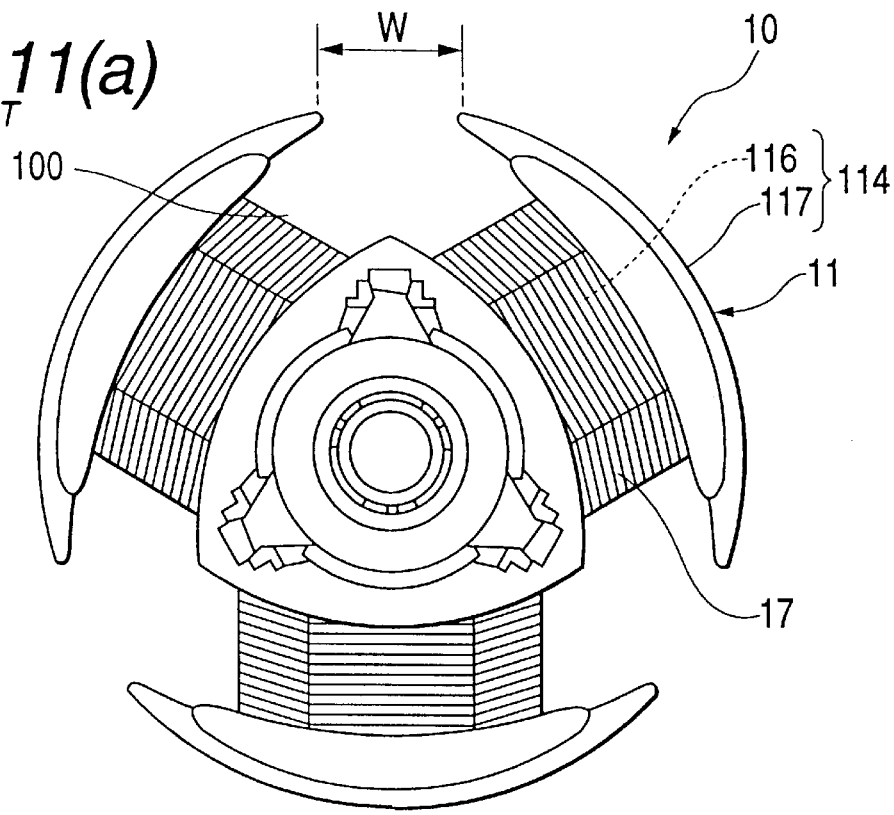
FIG. 11(a) is a plan view showing an armature used by the prior motor.
Figure 11B:
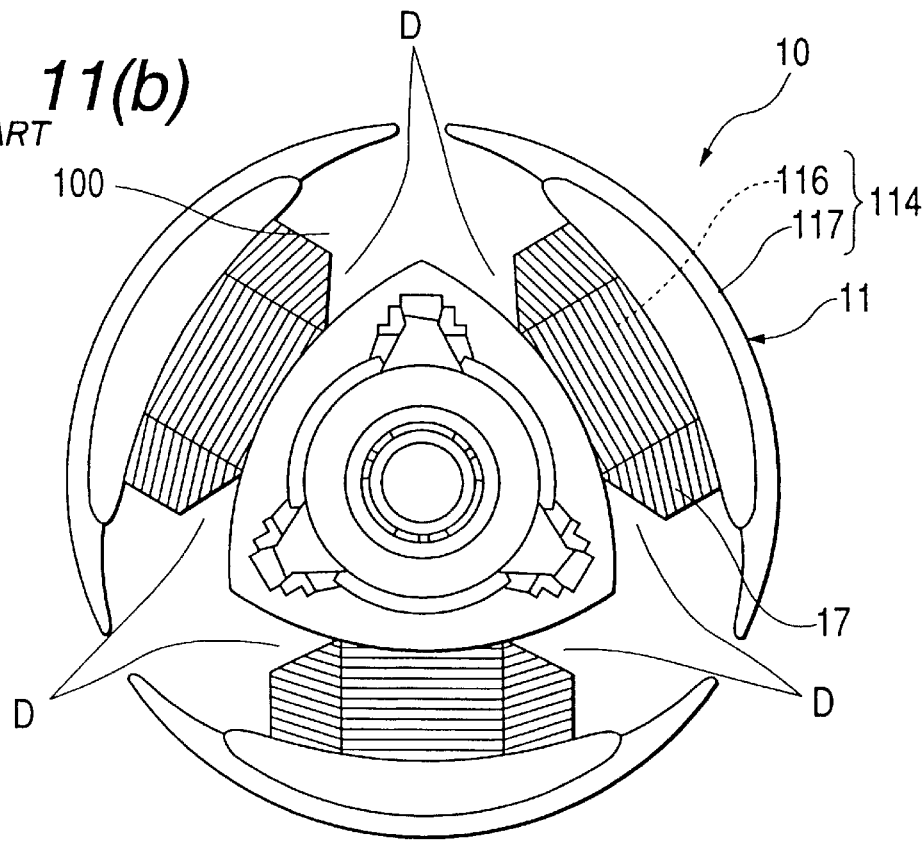
FIG. 11(b) is a plan view useful in explaining the problems arising from the reduction of the opening width of the armature core of the motor.

Some useful effects of the motor 1, empirically confirmed by us, are presented below. Firstly, variations of the motor torque were measured. In the measurement, two types of motors were used; one is the prior motor in which the openings of the armature core 11 are wide (FIG. 11(a)), and the other is the motor 1 constructed according to the present invention. A variation of the torque of the prior motor, measured, is plotted on the graph of FIG. 5(a), and a variation of the torque of the motor 1 of the invention is plotted on the graph of FIG. 5(b). The torque curve of the prior motor (FIG. 5(a)) shows that the torque curve greatly varies at six locations during one turn of the armature 10 (the variation is caused by the cogging). On the other hand, the torque curve of the motor 1 (FIG. 5(b) shows that no cogging caused torque variations is observed (since the opening width of the armature core 11 is reduced). A difference $|\Delta\tau_2|$ between the maximum torque value $\tau_{max.2}$ and the minimum torque value $\tau_{min.2}$ is approximately 0.18 mN·m (millimeter·newton·meter) in the motor 1. The difference $|\Delta\tau_2|$ of the motor 1 is approximately ½ of the difference $|\Delta\tau_1|$ between the maximum torque value $\tau_{max.1}$ and the minimum torque value $\tau_{min.1\ in\ the\ prior\ motor}$. From these facts, it is clear that the motor 1 of the invention smoothly rotates while being free from the cogging.

Figure 6A:
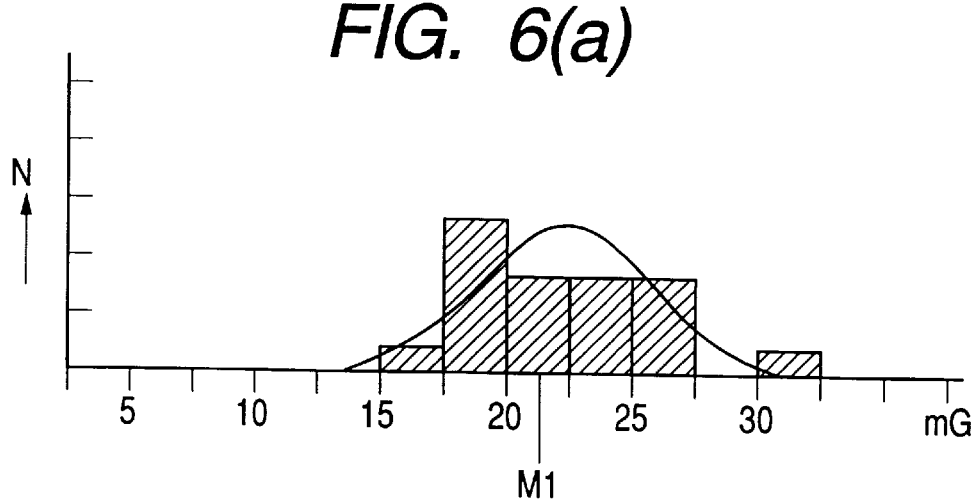
FIG. 6(a) is a graph showing a histogram of a vibration distribution of the prior motor.
Figure 6B:
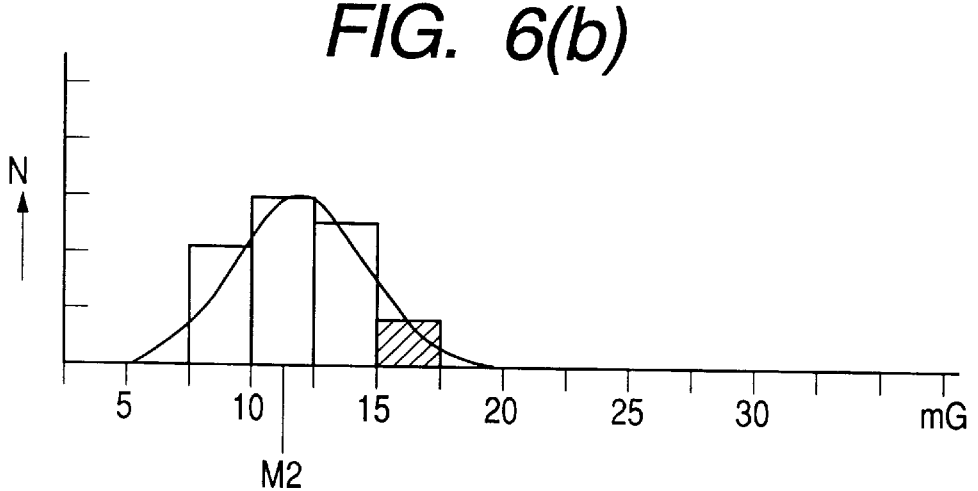
FIG. 6(b) is a graph showing a histogram of the motor of the first embodiment.

Secondly, vibration values (mG) of drive devices, e.g., drive units for driving CDs (compact discs), into which the motors 1 of the invention and the prior motors were assembled were measured. For the measurement, 20 number of samples of the drive units incorporating those motors thereinto were used for the measurement. The results of the measurement are shown in FIGS. 6(a) and 6(b). As shown, the results are depicted in the form of histograms. As seen from the graphs, the mean value M1 of the vibration values is 22.000 mG in the drive units using the prior motors, and the mean value M2 of the vibration values is 11.5 mG in the drive units using the motor 1 of the invention. It is noted that the mean value M2 is substantially the half of the mean value M1. This value reduction results from such a unique armature structure of the invention that the opening width is reduced to eliminate the torque variations caused by the cogging.

Modification of the first embodiment

Figure 7:
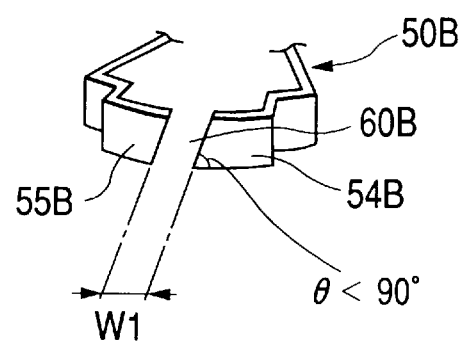
FIG. 7 is a perspective view showing an open-width adjusting member used in the motor of the first embodiment, when viewed from the flux gathering portion side.

The opening-width adjusting member 50A in the first embodiment mentioned above may be modified into an opening-width adjusting member 50B as shown in FIG. 7. A gap 60B is also present between the flux gathering parts 54B and 55B of the opening-width adjusting member 50B. The edges of the tips of the flux gathering parts 54B and 55B, which define the gap 60B, are skewed at an angle θ (θ<90°) with respect to the thick direction of the armature core 11, whereas the edges defining the corresponding gap 60A in the first embodiment are extended straightforwardly in the thick direction of the armature core 11. The gap 60B defined by the skewed edges provides a smooth variation of the reluctance. The result is to more efficiently suppress the cogging. Formation of the skewed gap 60B is very easy; there is no need of such an elaborate and labor-consuming work as to shift the core plates one by one in the manufacturing of the armature core 11.

Second embodiment

An opening-width adjusting member used in the second embodiment is formed with a unit structure consisting of magnetic pieces and a resin piece, while the opening-width adjusting member is entirely formed with the magnetic plate in the first embodiment. The following points are common to both the second embodiment and the first embodiment. A first point is that the opening width of the armature core is equal to the opening width of each open slot in the stage of winding the drive coil around the salient poles; that is, it is wide enough to wind the drive coil properly. A second point is that after the winding of the drive coil, the opening-width adjusting members are set in the open slots. Therefore, no further explanation on this will be given.

Figure 8A:
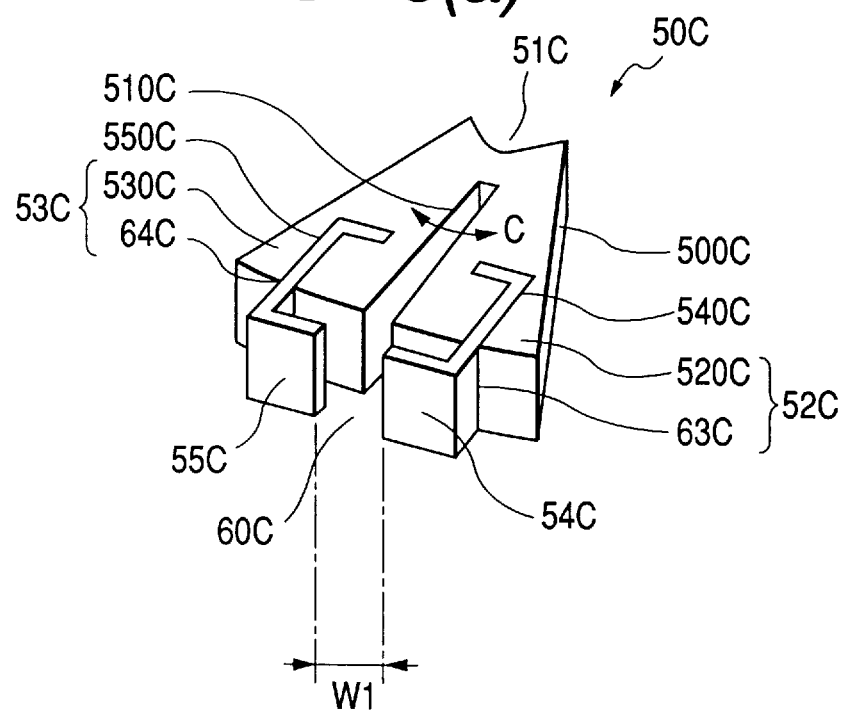
FIGS. 8(a) is a perspective view showing an opening-width adjusting member used by the motor, which is an second embodiment of the invention, when viewed from the flux gathering portion side.
Figure 8B:
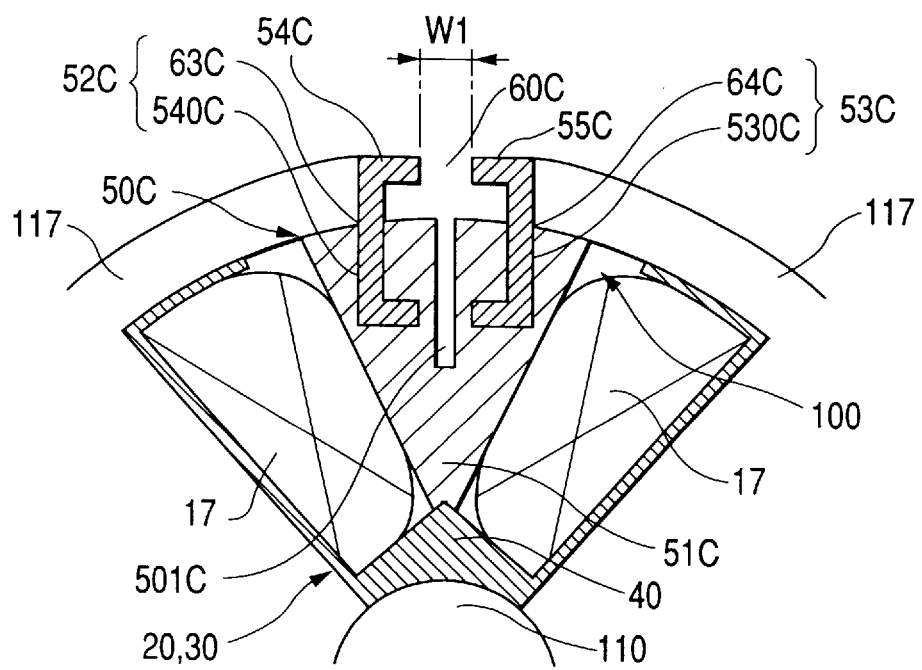
FIG. 8(b) is a traverse cross section showing a part of the armature core when the opening-width adjusting member is put in the open slot of the armature core.

FIGS. 8(a) is a perspective view showing an opening-width adjusting member used by the motor of the second embodiment when viewed from the flux gathering portion side, and FIG. 8(b) is a traverse cross section showing a part of the armature core when the opening-width adjusting member is put in the open slot of the armature core.

As shown, an opening-width adjusting member 50C is formed with a fan-like resin block 500C made of polyoxymethylene, for example, and U-shaped magnetic pieces 540C and 550C. The resin block 500C includes a first positioning part 51C which comes in contact with the base 110 that is located at the center of the armature core 11. The resin block 500C is cut along the center line thereof while ranging from a position near to the first positioning part 51C toward the outer extreme end, whereby a slit 501C is formed in the resin block 500C. The resin block 500C is divided, by the slit 501C, into segmental portions 520C and 530C. Those segmental portions, which are elastically deformable when forces are applied thereonto, may be bent or is flexible in a direction in which those portions approach to each other and in another direction in which those portions move away from each other.

As shown, the U-shaped magnetic pieces 540C and 550C are implanted in the resin block 500C; those magnetic pieces are partially protruded above the outer extreme ends of the segmental portions 520C and 530C, which are parted from each other by the slit 501C; and the protruded portions (including the legs of the shape U) of the magnetic pieces are shaped like L when viewed from side. The L-shaped protruded portions, which serve as flux gathering portions 54C and 55C, are confronted with each other with a gap 60C between the tips of the legs of the L-shaped protruded portions, while being faced to the ring-like magnet 5 (FIG. 1) when radially viewed. The gap 60C has the width W1, and the inner surfaces of the gap 60C are extended straightforwardly in the thick direction of the armature 10.

Steps 63C and 64C are formed by the L-shaped protruded portions of the flux gathering portions 54C and 55C and the upper end surface of the resin block 500C, more exactly, the upper surfaces of the segmental portions 520C and 530C of the resin block 500C, which are parted by the slit 501C. As stated above, those segmental portions, which are elastically deformable when receiving forces applied thereonto, may be bent or is flexed in a direction to make those portions approach to each other and in another direction to move those portions away from each other. Thus, in the present embodiment, the resin block 500C includes the elastically deformable segmental portions 520C and 530C separated by the slit 501C, and the steps 63C and 64C. Therefore, the resin block 500C may be considered to have the first positioning part 51C, and two second positioning parts 52C and 53C extended radially outward from the first positioning part 51C. Those second positioning parts 52C and 53C, when receiving forces applied thereonto, may be bent or is flexible to approach to each other and to move away from each other, and elastically come in contact with the side edges of the arcuate heads 117 of the adjacent armature cores 11.

The first positioning part 51C comes in contact with the base 110 of the armature core 11 with the insulators 20 and 30 being interposed therebetween since the armature core 11 is covered with those insulators. A coil guide 40 is triangularly protruded into a portion which comes in contact with the first positioning part 51C constructed with the insulators 20 and 30. The first positioning part 51C is shaped like V so as to receive the triangularly protruded coil guide 40.

The opening-width adjusting member 50C thus constructed is also put in each of the open slots 100 after the drive coil 17 is wound around the arms 116 of the armature core 11, which have been covered with the insulators 20 and 30. The opening-width adjusting member 50C is somewhat larger than the open slot 100; however, when the second positioning parts 52C and 53C of the opening-width adjusting member 50C are compressed, those positioning portions are flexed with the first positioning part 51C being fixed. Therefore, the second positioning parts 52C and 53C of the opening-width adjusting member 50C are flexed or bent inwardly; the opening-width adjusting member 50C is put in each open slot 100; and the compressing force is removed; the second positioning parts 52C and 53C will restore their original shapes by its elasticity, viz., those portions expand within the open slot. As a result, the opening-width adjusting member 50C is positioned there with the engagement of the first positioning part 51C with the coil guide 40, and further with the engagement of the steps 63C and 64C of the second positioning parts 52C and 53C with the side edges of the arcuate heads 117. In this way, the opening-width adjusting member 50C is positioned and fixed within the open slot 100 by the utilization of its elasticity. In a state where the steps 63C and 64C are in engagement with the side edges of the arcuate heads 117, the flux gathering parts 54C and 55C are in align with the prolongation from the arcuate heads 117 and never deviate outward from the prolongation.

Also in the second embodiment, the opening width of the armature core 11 is sufficiently wide in the stage of winding the drive coil 17 on the salient poles 114. After the winding of the drive coil 17, the opening-width adjusting members 50C are put in the open slots 100. Each opening of the armature core 11 is partially occupied by the paired flux gathering portions 54C and 55C. The opening width of the armature core 11 is reduced to the width W1 of the gap 60C between the paired flux gathering portions 54C and 55C.

Modification of the second embodiment

A modification of the second embodiment will be described with reference to FIGS. 9(a) and 9(b). In this modification, the second positioning parts are formed with on a synthetic resin block, while in the second embodiment described above, the elasticity of the resin block 500C and the steps 63C and 64C of the paired flux gathering portions 54C and 55C as the magnetic pieces are utilized for forming the second positioning parts 52C and 53C.

Figure 9A:
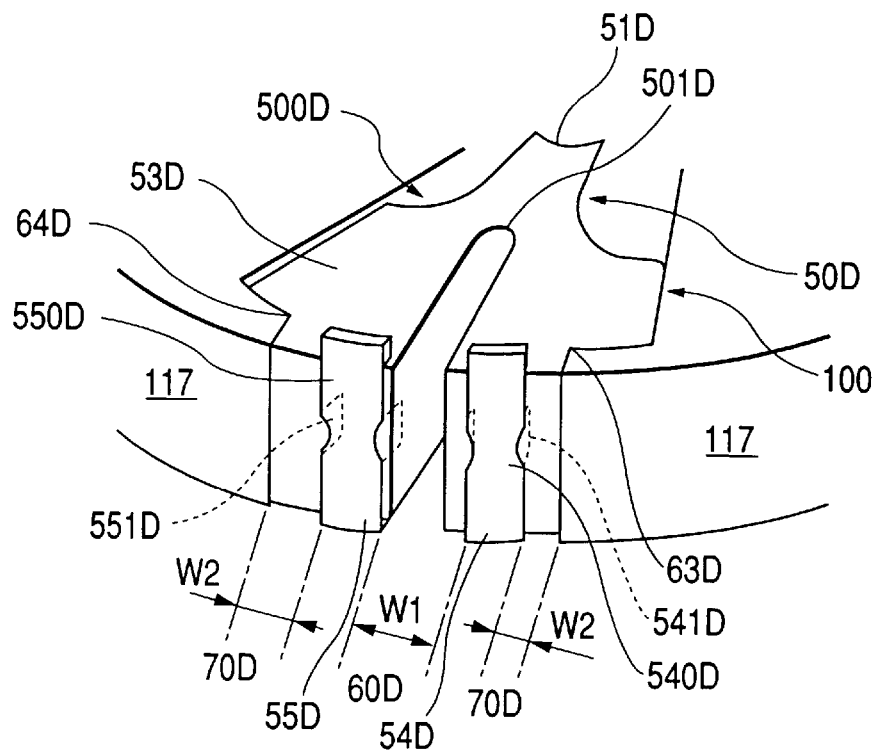
FIG. 9(a) is a perspective view showing a part of the armature of the motor of the second embodiment, the illustration showing that an opening-width adjusting member is put in an open slot of the armature core.
Figure 9B:
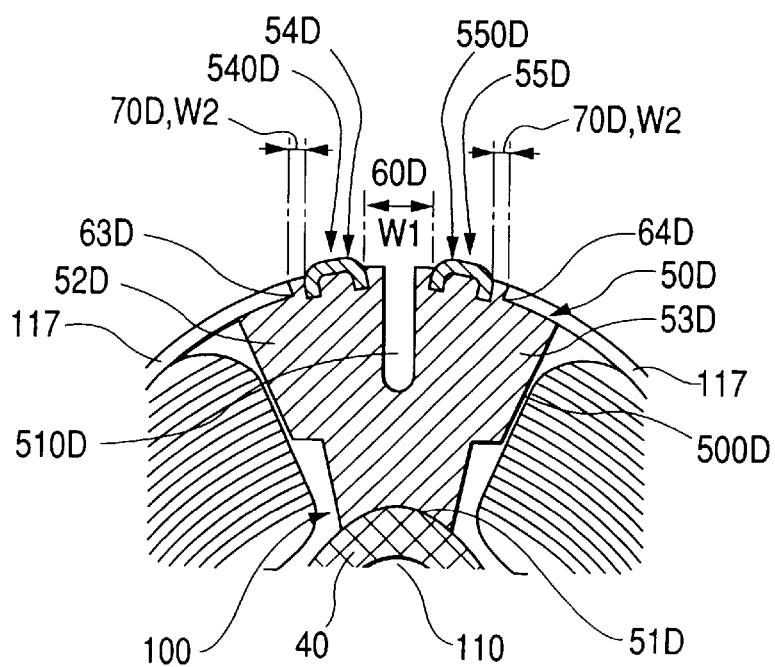
FIG. 9(b) is a traverse cross section showing the part of the armature core shown in FIG. 9(a)

FIG. 9(a) is a perspective view showing a part of the armature in which an opening-width adjusting member is put in an open slot of the armature core, and FIG. 9(b) is a traverse cross section showing the part of the armature core shown in FIG. 9(a).

As shown in those figures, an opening-width adjusting member 50D of the motor is also formed with a resin block 500D which is configured like a fan so as to be in conformity with the plan configuration of each open slot 100. The resin block 500D also includes a first positioning part 51D and two second positioning parts 52D and 53D. The first positioning part 51D comes in contact with the base 110 that is located at the center of the armature core 11. The second positioning parts 52D and 53D are extended radially outward from the first positioning part 51C, and elastically deformable when put under forces applied thereonto. Those positioning parts may be bent or is flexible to approach to each other and to move away from each other. Those second positioning parts 52D and 53D are parted from each other by a slit 501D. With the presence of the slit 501D, those positioning parts are flexible inward or in the direction to make them approach to each other. Steps 63D and 64D are formed at the extreme ends of those second positioning parts 52D and 53D. Those steps of the second positioning parts 52D and 53D are brought into contact with the side edges of the arcuate heads 117 of the salient poles.

The opening-width adjusting member 50D is a molded product consisting of the resin block 500D and two magnetic pieces 540D and 550D. Both sides of the central part of each of the magnetic pieces are cut and raised to form raised parts 541D (551D). Those raised parts of the magnetic pieces 540D and 550D are infixed into the resin block 500D.

The magnetic pieces 540D and 550D, while being vertically elongated, are located on the upper end surfaces of the second positioning parts 52D and 53D of the resin block 500D, respectively. When the opening-width adjusting member 50D is put in each open slot 100, it is confronted with the ring-like magnet 5 (FIG. 1) while being located between the arcuate heads 117 of the salient poles 114.

Also in the motor using the thus constructed opening-width adjusting member 50D, the opening width of the armature core 11 is sufficiently wide in the stage of winding the drive coil 17 on the salient poles 114. After the winding of the drive coil 17, the opening-width adjusting members 50D are put in the open slots 100. Each opening of the armature core 11 is partially occupied by the paired flux gathering portions 54D and 55D. The opening width of the armature core 11 is reduced to the width W1 of the gap 60D between the paired flux gathering portions 54D and 55D.

When the opening-width adjusting member 50D is disposed within the open slot 100, the flux gathering portions 54D and 55D are spaced from the arcuate heads 117 of the salient poles 114 by gaps 70D of the width W2 as shown. If the gap width W2 is selected to be within the range of 0 to 0.2 mm, no problem arises in the magnetic flux gathering function of those flux gathering portions 54D and 55D.

Other embodiments

Figure 10A:
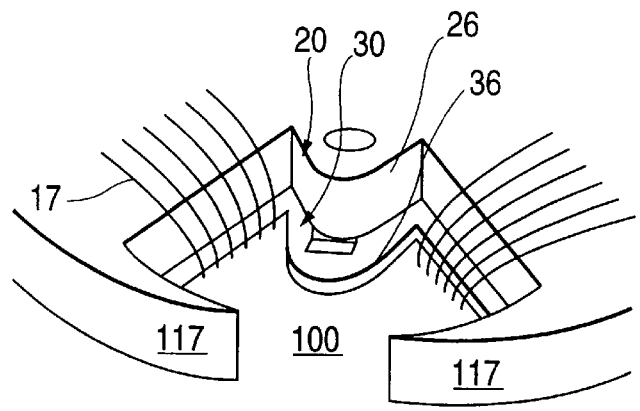
FIG. 10(a) is a perspective view showing a key portion of a motor which is a further embodiment of the present invention, the illustrating showing that both sides of the armature core are covered with insulators.
Figure 10B:
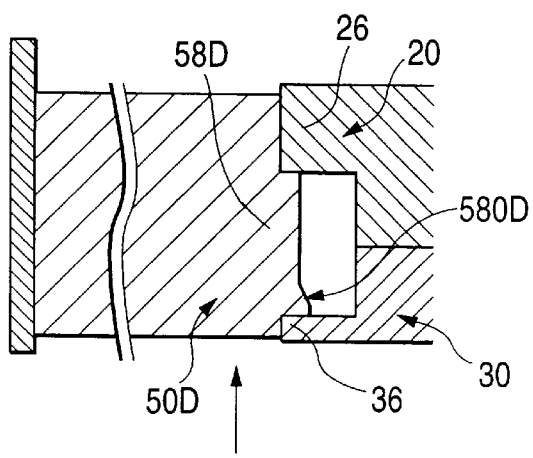
FIG. 10(b) is a longitudinal sectional view of the motor.
Figure 10C:
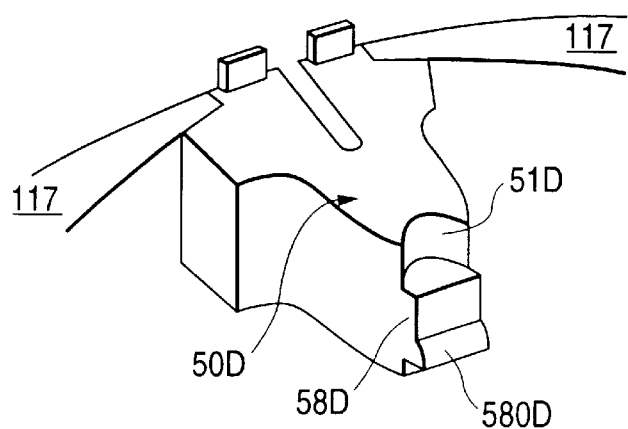
FIG. 10(c) is a perspective view showing an open-width adjusting member used in this embodiment when viewed from its first positioning part side.

In all the embodiments mentioned above, the armature cores 11 are covered with the insulators 20 and 30 described in connection with FIG. 3. This logically leads to the fact that the upper and lower sides of each opening-width adjusting member may be covered by use of the output-side insulators 20 and 30. An example of this idea may be implemented into an armature core structure as shown in FIGS. 10(*a*) to 10(*c*). As shown, the insulator 20 is provided with a hard collar 26 serving as a stopper, while the insulator 30 is provided with a thin collar 36 (FIGS. 10(*a*) and 10(*b*)). An extended portion 58D is provided on the end surface of the first positioning part 51D of the opening-width adjusting member 50D in a state that the extended portion 58D is located between the two collars 26 and 36 (FIG. 108*c*)). After the drive coil 17 is wound on the arms 116 (FIG. 10(*a*)), the opening-width adjusting member 50D is moved to each open slot 100 from the underside of the slot and set therewithin (FIG. 10(*c*)). At this time, the extended portion 58D of the first positioning part 51D of the opening-width adjusting member 50D advances while bending the thin collar 36 of the counter output-side insulator 30, and is abutted against the hard collar 26 of the output-side insulator 20 and stopped thereat. Further, the thin collar 36 of the counter output-side insulator 30 is brought into engagement with the underside of the extended portion 58D of the first positioning part 51D of the opening-width adjusting member 50D, to thereby prevent the opening-width adjusting member 50D from slipping off from the open slot 100. Provision of a protruded part 580D having a tapered upper surface on the extended portion 58D will assist the work in inserting the opening-width adjusting member 50D into the space between the collars 26 and 36. Further, the protruded part 580D advantageously functions as a stopper to prevent the opening-width adjusting member 50D from slipping off from the space between the collars 26 and 36.

While the motors in the motors described in the embodiments mentioned above use the armature cores of the inner rotor type, it is evident that the invention is applicable to the motors of which the armature cores are of the fixed rotor type or the outer rotor type.

As seen from the foregoing description, in the stage of winding the drive coil on the salient poles, the opening width of the armature core is sufficiently wide. Therefore, the drive coil may be wound properly. After the winding of the armature core, the opening-width adjusting member is put in each open slot. With the putting of the open-width adjusting member, the opening width of the armature core is reduced at the magnetic flux gathering parts of the opening-width adjusting member. The reduced opening width accrues to the following advantages: a variation of magnetic flux distribution is suppressed; the magnetic flux gathering function is enhanced; no cogging occurs; and a smooth rotation of the motor is secured. Further, the open-width adjusting member is fixed within each open slot by the utilization of the first and second positioning parts of the open-width adjusting member and the elasticity of the open-width adjusting member. This technical feature of the invention provides reliable positioning and fixing of the open-width adjusting member within the open slot, and an easy assembling of the motor.

What is claimed is:

1. A motor comprising:

an armature core including a plural number of salient poles each having an arm and an arcuate head extending to both sides at the top of said arm, and a base having circumferential outer surfaces, said base interconnecting the lower ends of said salient poles, said salient poles extending radially and outwardly from said base;

open slots each formed between said adjacent salient poles;

a drive coil wound on said arms of said armature core;

a magnet disposed while being confronted with the circumferential outer surfaces of said arcuate heads; and open-width adjusting members located into said open slot, each of said open-width adjusting members including: a first positioning part arranged to either one of directly contact with said circumferential outer surfaces of said base and indirectly contact with said circumferential outer surfaces of said base through an interposing member; second positioning parts extending radially and outwardly from said first positioning part, each second positioning part being elastically brought into contact with said salient pole serving as said open slot in such a manner said second positioning parts are either elastically deformable in one direction to move said second positioning parts to approach to each other and elastically deformable in another direction to move said second positioning parts away from each other; and flux gathering parts respectively formed on each tip end of said second positioning parts on an arc shaped space defined between said salient poles so as to confront with said magnet, wherein said armature core is rotated relative to said magnet.

2. The motor according to claim 1, wherein said second positioning part is resiliently brought into contact with a side edge of said arcuate head.

3. The motor according to claim 1, wherein said interposing member is a part of an insulator for insulating said armature core from said drive coil.

4. The motor according to claim 1, wherein said armature core is provided with coil guide protruded from the circumferential outer surface of said base of said armature core, said coil guide guides said drive coil when said drive coil is wound on said arm of said armature core, and said open-width adjusting member is formed such that said first positioning part is brought into contact with said coil guide.

5. The motor according to claim 1, further comprising:

a pair of insulators applied to both sides of said armature core in an axial direction for insulating said armature core from said drive coil, said pair of insulators have a pair of collars expanding outward from the circumferential outer surface of said base of said armature core, said pair insulators sandwiching said open-width adjusting member therebetween to position said open-width adjusting member.

6. The motor according to claim 1, wherein each said open-width adjusting member is defined by a gap between said flux gathering parts being skewed.

7. The motor according to claim 1, wherein at least one of said first positioning part and said second positioning parts is made of resin.

* * * * *